(12) United States Patent
Hayes et al.

(10) Patent No.: US 6,694,269 B2
(45) Date of Patent: Feb. 17, 2004

(54) CAPACITIVE CIRCUIT ARRAY FOR FINGERPRINT SENSING

(75) Inventors: Robert S. Hayes, Lawndale, CA (US); Gregory S. Um, Torrance, CA (US)

(73) Assignee: Sentronics Corporation, Torrance, CA (US)

( * ) Notice: Subject to any disclaimer, the term of this patent is extended or adjusted under 35 U.S.C. 154(b) by 181 days.

(21) Appl. No.: 09/839,865

(22) Filed: Apr. 23, 2001

(65) Prior Publication Data

US 2002/0156593 A1 Oct. 24, 2002

(51) Int. Cl.[7] .................................................. G06K 9/00
(52) U.S. Cl. .......................................... 702/57; 382/108
(58) Field of Search ............................ 702/57, 87, 153, 702/167, 189; 382/108, 116, 181, 199, 312

(56) References Cited

U.S. PATENT DOCUMENTS

| | | | | |
|---|---|---|---|---|
| 4,225,850 A | * | 9/1980 | Chang et al. | 382/124 |
| 4,577,345 A | * | 3/1986 | Abramov | 382/124 |
| 5,862,248 A | * | 1/1999 | Salatino et al. | 382/124 |
| 5,907,627 A | * | 5/1999 | Borza | 382/124 |
| 5,940,526 A | * | 8/1999 | Setlak et al. | 382/124 |
| 5,978,496 A | * | 11/1999 | Harkin | 382/124 |
| 6,108,438 A | * | 8/2000 | Bird et al. | 382/124 |
| 6,370,965 B1 | * | 4/2002 | Knapp | 73/862.046 |

* cited by examiner

Primary Examiner—Marc S. Hoff
Assistant Examiner—Edward Raymond
(74) Attorney, Agent, or Firm—Irving Keschner

(57) ABSTRACT

A low cost capacitive fingerprint sensor which can be fabricated on various substrates, such as large glass or plastic substrates. The sensor is made by depositing and patterning alternate layers of conductive and insulation materials. A pixel of the sensor is comprised of a pick up pad and a plurality of voltage electrodes symmetrically placed around the pick up pad. The symmetry is such that only when a finger surface ridge is present, the pick up pad registers a signal.

6 Claims, 4 Drawing Sheets

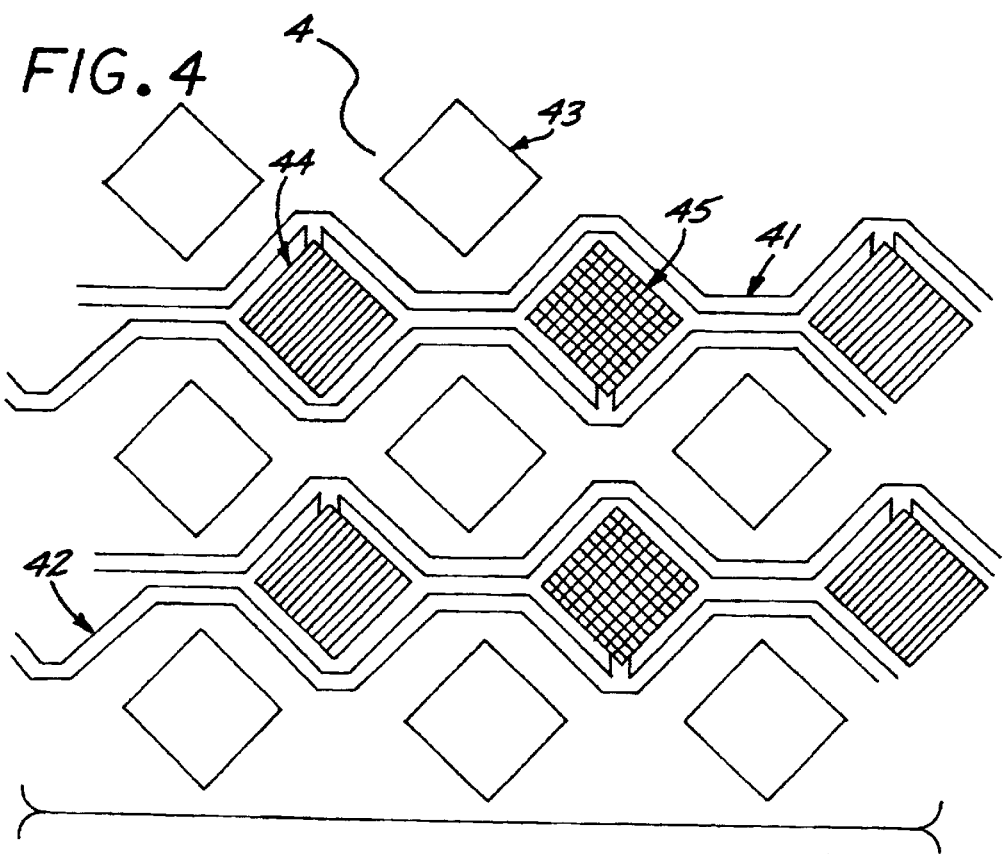
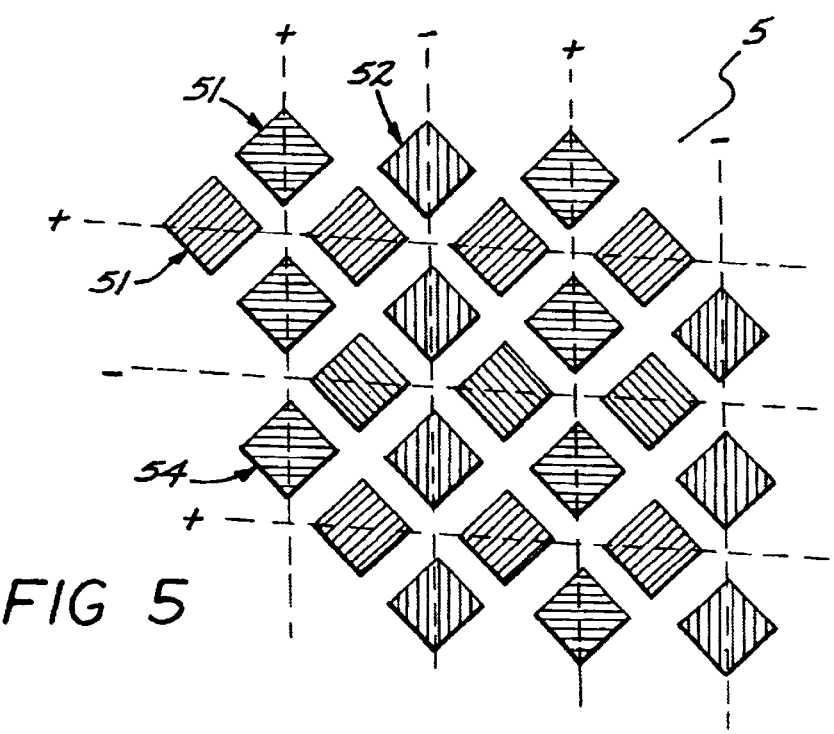

CAPACITIVE CIRCUIT ARRAY FOR FINGERPRINT SENSING

BACKGROUND OF THE INVENTION

1. Field of the Invention

The present invention relates to two dimensional mapping of finger print patterns for identification purposes utilizing a capacitive circuit array.

2. Description of the Prior Art

Fingerprint sensing and the associated identification systems which include data bases and a match algorithm processor have been available in the prior art. In the area of the fingerprint sensor, the primary prior art systems utilizes an optical scanning method which is relatively bulky and expensive due to the optics, lasers and the CCD array utilized. Due to this reason, there have been attempts to develop electronic means of sensing fingerprint patterns. All electronic fingerprint sensors can be categorized as follows; tactile pressure sensors, thermal sensors and capacitive sensors. The first two categories are complex and expensive to make, and thus most of recent development activities are in the area of capacitive sensors.

One group of capacitive sensors rely on thin deformable membranes with metal electrodes (one electrode per pixel) coated underneath each membrane. If the membrane is very thin and can follow the finger surface deformation, the distance of the metal electrodes can be measured through capacitance means. However, such thin membranes are not durable, and hence, are not yet marketable.

Another group of capacitive fingerprint sensors read the capacitance from the rigid sensor electrodes to the finger surface ridges directly without relying on membranes. In this case, the capacitance variation due to the finger surface variation is minute, with a typical order to a few femto farads, and the signal is imbedded in the larger background and parasitic capacitance from the finger and the sensor structure. Therefore, somewhat complex circuitry such as those disclosed by Tartagni et al, in an article entitled "Fingerprint Sensor Based on the Feedback Capacitive Sensing Scheme", IEEE Journal of solid State Circuits, Vol. 33, p. 133 (1/1998) and U.S. Pat. No. 5,835,141 to Aukland et al, have been implemented to filter out the background capacitance. The circuitry utilized in Tartagni et al, and Aukland et al, involve several transistors, an amplifier or charge accumulation and transfers in every pixel, making the sensor array essentially a large silicon chip and expensive to manufacture.

Copending application Ser. No. 09/550626 describes a new way of sensing with simple low cost fabrication by applying external fields which are diametrically opposed in respect to a pick up pad in the center. When a uniform finger surface is in contact, the fields cancel and pick up pad reads a null signal, but if there is a surface ridge, the fields are imbalanced and the pick up pad picks up a signal. Although the circuit described therein performs satisfactorily, it is desired to provide an improved system wherein the sensor is more sensitive and substantially immune from misreadings.

SUMMARY OF THE INVENTION

The present invention provides top electrode patterns applied on a substrate to which four or more phase external fields are applied at a given sensor scan time (frame time) or at two consecutive scan times. The readout lines and the sensor structure are symmetrical such that the parasitic capacitance from the sensor structure cancel out. The advantage of being able to fabricate the sensor on any substrate, such as glass, polymer and ceramics, is retained, the sensor being more sensitive and substantially immune from false readings.

BRIEF DESCRIPTION OF THE DRAWINGS

For better understanding of the present invention as well other objects and further features thereof, reference is made the following description which is to be read in conjunction the accompanying drawing therein:

FIG. 4 is an example of address lines for the external voltage drivers which are made symmetrical with respect to the pick up pads;

FIG. 5 illustrates the sensor where each pad serves at different scan times as either a pick-up pad or a voltage pad.

DESCRIPTION OF THE INVENTION

Figure 1A:
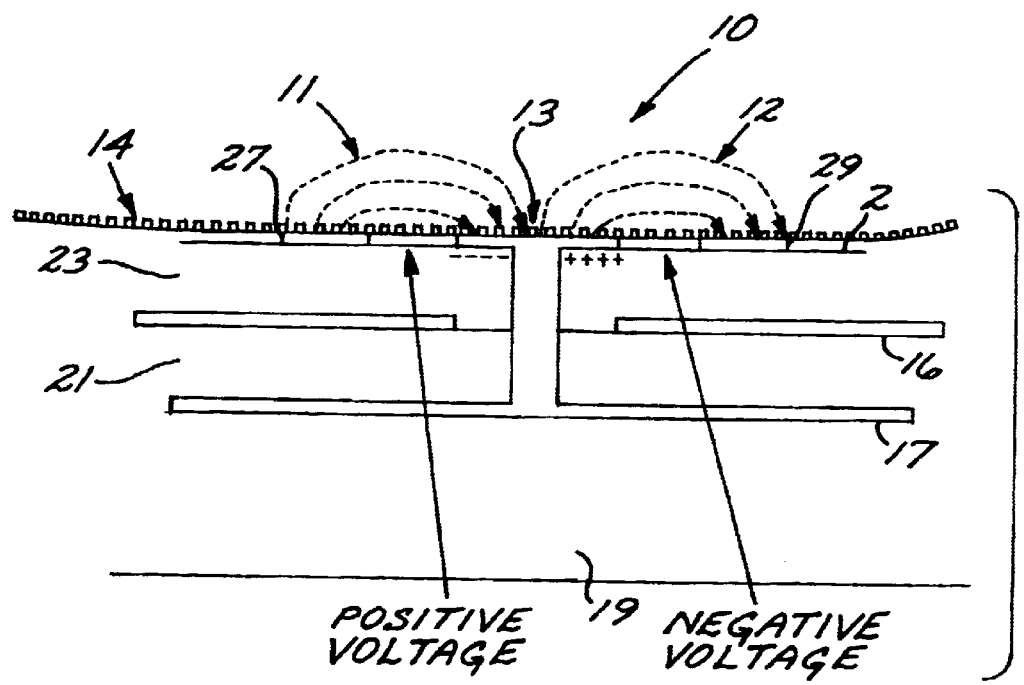
FIGS. 1(a) and 1(b) show the basic concept of the present invention.
Figure 1B:
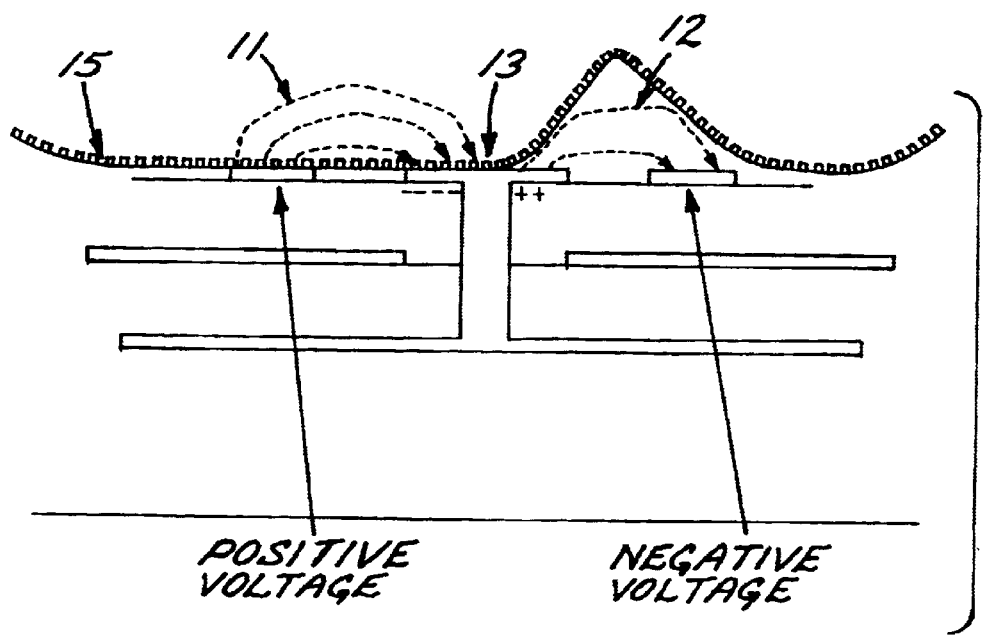

FIGS. 1(a) and 1(b) show a simplified version of the basic sensor device 10 of the present invention. Diametrically opposing fields 11 and 12 are generated within a pixel 10 (one point of the array) of the sensor array across pick up pad 13 by external voltage drivers, and when the contact surface 14 is uniform, the charges induced on the pick up pad 13 are zero or close to zero as shown in FIG. 1a (note that although only one pixel is illustrated, the actual device comprises a two-dimensional array of pixels). However, if the surface in contact 15 is non-symmetric, as shown in FIG. 1(b), then the fields become distorted and the induced charges on the pick up pad 13 do not cancel, and the pick up pad 13 registers a signal which is interpreted as the presence of a finger surface ridge. Pixel 10 further comprises shield 16, signal lines 17, substrate 19, insulation layers 21 and 23 and electrode pads 27 and 29 (a positive voltage is applied to pad 27; a negative voltage is applied to pad 29) formed on conductive layer 2. Shield layer 16 serves to block fields emanating from electrodes 27 and 29 such that readout lines 17 are not effected by the staying fields. Substrate 19 can be formed of an insulating material or a semiconductive substrate with an insulation coating.

The entire structure of the sensor is essentially alternating layers of conductors and insulators, with conductive layers patterned in certain ways and the insulator layers patterned with holes. Therefore, the fabrication of the sensor requires simple inexpensive machines with no active elements in the sensor array itself. This makes the sensor immune to the high voltage static damage unlike the silicon chip sensors of the prior art. In addition, the sensor can be made on large inexpensive substrates which makes the sensor die cost inexpensive. An example of a structure having additional layers of conductors and insulators would be, for example, when the drive lines are placed beneath the top surface of insulation layer 23.

Figure 2:
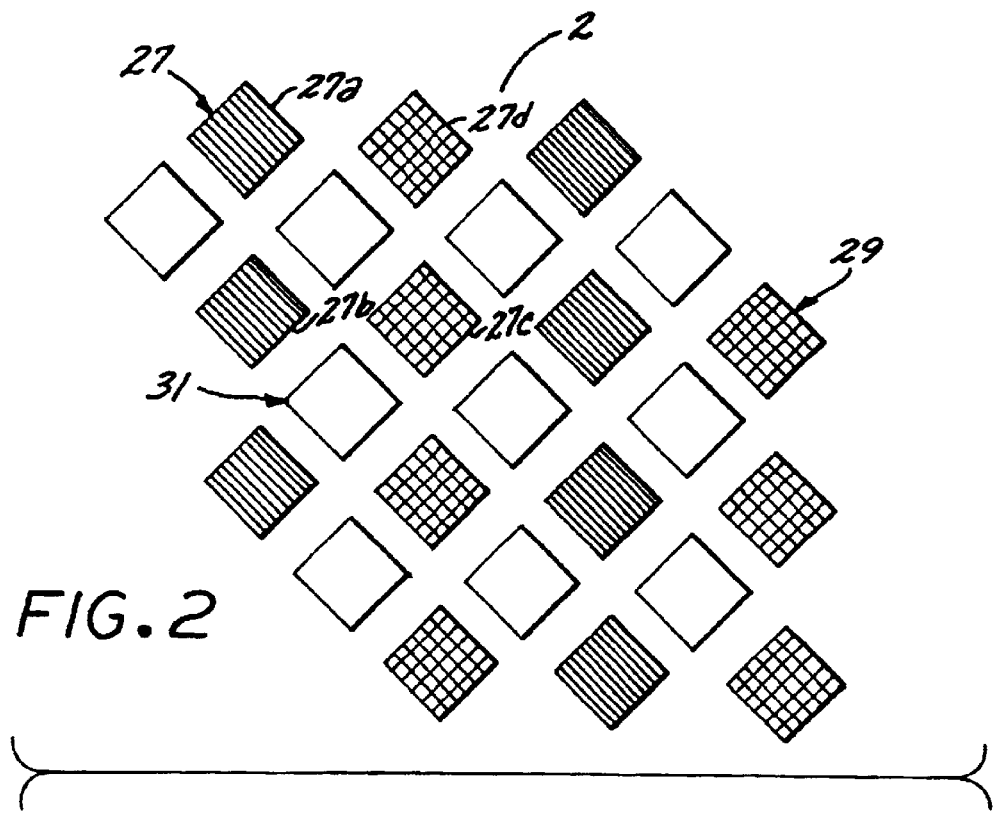
FIG. 2 shows a pattern of the top layer of the sensor which is in close proximity to the finger surface.

FIG. 2 shows a layout of the top most conductor layer 2 of the sensor which is in contact with the finger surface. As an option, the sensor can be protected by a protective thin insulating layer, in which case the pattern of FIG. 2 will be the second layer but still the top most conductive layer. The shaded squares 27 are the electrodes which are applied with positive voltages, the cross hatched squares 29 are the electrodes which are applied with negative voltages, and the open squares 13 are the pick up pads. There are two pairs of positive and negative electrodes and one pick up pad per pixel, but the voltage electrodes are shared with the neighbor pixels (electrodes 27a, 27b, 27c and 27d form one pixel). At any given time, a pair of rows of voltage electrodes 27 and 29 are activated and the pick up pads 13 are read out. Therefore, there are two readings per pixel, although four voltages could be applied simultaneously. During the reading, a detected signal indicates ridges in the surface of a finger are present on surface 2. A processor combines (superimposes) the two readouts and produces a complete reading of the fingerprint.

Figure 3:
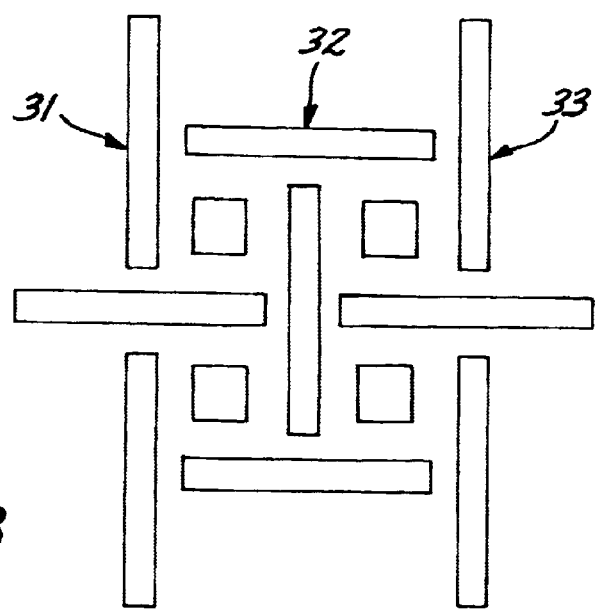
FIG. 3 is a further example of possible patterns for the top layer.

FIG. 3 shows that the top conductive layer pattern can take a variety of forms using the basic principle of the present invention. The rectangles are the positive and negative voltage electrodes 31 and 32 respectively, and the squares 33 are the pick up pads.

FIG. 4 shows a typical pattern of the second (third if there is a shield layer) conductive layer 4 (corresponds to the drive line layer) which has the address lines 41 and 42 for the external applied voltages. These lines are orthogonal to the signal lines underneath (not shown), the signal (readout) lines and addresses lines being on different layers so that they do not intersect. The pick up pad goes through the signal area 43 to the lower signal lines via holes. Note that the address lines 41 and 42 are symmetrically placed around the signal area 43 such that the applied voltage influences cancel out at this layer level. The areas 44 and 45 are where the voltage electrodes 27 and 29, respectively, of the top conductive layer 2 come down through via holes in the intermediate insulation layer 23. In summary, the entire structure of the sensor is constructed such that the applied fields through the sensor structure alone generate null signals, and only the finger surface ridges will generate a signal, the driver lines being symmetric with respect to the readout pads.

The multiple conductive layers in the sensor structure could be slightly misaligned during the fabrication giving rise to a fixed parasitic signal pattern in the array even when the external impinging surface is uniform. In this case, the fixed parasitic pattern can be stored in the processor and subtracted from the real readout.

FIG. 5 shows an example of a conductive layer 5 structure, similar to that shown in FIGS. 1(a) and 1(b), where electrodes serve as voltage pads at one time and as pick up pads at another time. In this way, the number of layers is reduced, simplifying the fabrication process. At the first scan period, the electrodes with horizontal or vertical shades 51 and 52 respectively, serve as pick up pads while the electrodes with diagonal shades 53, 54 function as voltage applying pads with alternating +/− voltages row to row as shown. In the next scan period, the electrodes with horizontal or vertical shades 51, 52 serve as voltage applying pads with the alternating voltage signs as shown, while electrodes 53, 54 serve as pick up pads. In this way, essentially the same information as the four phase conductive layer 2 can be obtained albeit two scans instead of one. The structure 5 can be made with as few as two metal layers with one metal layer with the pad patterns and the connection of one set of pads, for example 51, 52; while the other set of pads are connected at the lower metal layer. These connection lines are connected to IC's (integrated circuits) at the periphery of the sensor as shown in FIG. 6.

Figure 6A:
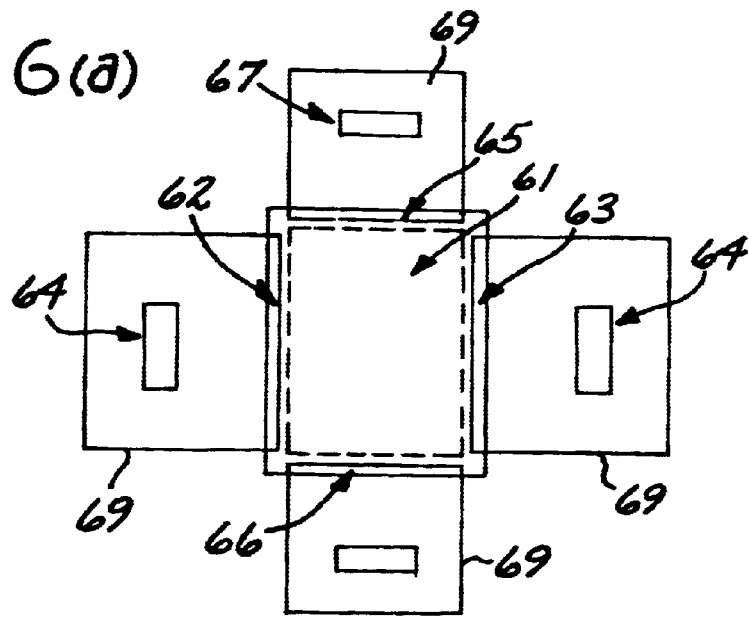
FIG. 6(a) and FIG. 6(b) show a complete sensor with voltage driver IC's and signal pick up IC's mounted on the sensor substrate.
Figure 6B:
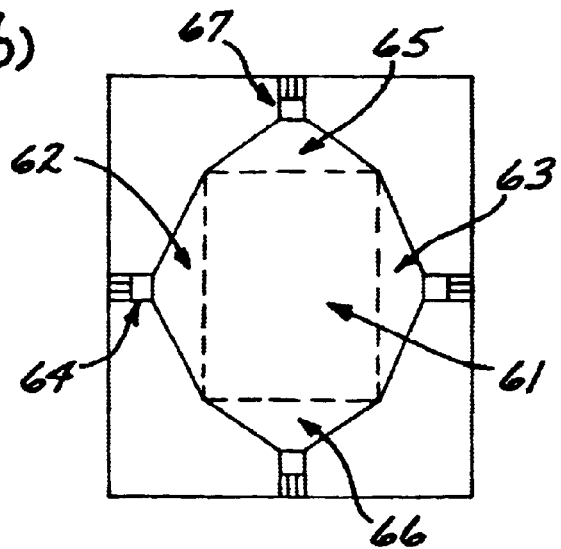

FIGS. 6(a) and 6(b) show typical packaging of the sensor device 10 (FIG. 6(a) illustrates the TAB package; FIG. 6(b) the surface mount). The central area 61 is for the sensor device array discussed hereinabove. The horizontal rows are the applied voltage lines, which enter into the central area 61 from both sides, one positive voltage 62 and one negative voltage 63. The driver IC's 64 are synchronized to drive a pair of positive and negative lines at a time. The signal lines extend from 65 and 66 of the sensor array area 61. Each signal line 65 and 66 connects every other pick up pad vertically to reduce cross talk (dotted lines in FIG. 2). The amplifier IC's 67 activate one column signal line at a time and amplifies the signal before ending it to the algorithm processor (not shown). Driver IC's 64 and Amplifier IC's 67 are formed on tape portions 69 as illustrated.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An electronic sensor array comprising alternate layers of conductor and insulator materials on a substrate wherein the top layer consists of a plurality of voltage electrode pads per array pixel and symmetrically disposed around each of said pick up pads such that when a uniform flat surface is impinging on the sensor top surface, said pick up pads generate substantially null signals while said voltage electrodes are coupled to at least to at least one independent voltage source.

2. The electronic sensor array of claim 1 wherein said plurality of voltage electrodes are comprised of four electrodes per array pixel and symmetrically disposed around each of said pick up pads.

3. The electronic sensor array of claim 1 comprising two sets of said electrode pads wherein one of said set of electrode pads function as pick up pads while the other of said set of electrode pads function as voltage pads, said functions alternating at the next scan frame of said sensor.

4. The electronic sensor array of claim 2 or claim 3 wherein lower conductive layers are symmetrically patterned with respect to said top conductive layer pattern such that the electrical fields generated within said sensor structure by externally applied voltages generate substantially null signals.

5. An electronic sensor array comprising alternate layers of conductor and insulator materials on a substrate wherein the top layer consists of two sets of pick up electrode pads and voltage electrode pads, such that when a uniform flat surface is impinging on the sensor top surface, said pick up pads generate substantially null signals while said voltage electrodes are coupled to at least one independent voltage externally, one of said set of electrode pads functioning as pick up pads while the other of said set of electrode pads functioning as voltage pads, said functions alternating at the next scan frame of said sensor.

6. An electronic sensor array comprising alternate layers of conductor and insulator materials on a substrate wherein the top layer consists of plurality of pick up electrode pads and voltage electrode pads, such that when a uniform flat surface is impinging on the sensor top surface, said pick up pads generate substantially null signals while said voltage electrodes are coupled to at least one independent voltage externally and an algorithm processor which processes the surface pattern on said sensor surface for the fingerprint identification and other surface pattern identification, a fixed parasitic pattern being stored in said algorithm processor and subtracted from the scanned readout data during said processing.

* * * * *